July 14, 1936.  F. W. GARDNER  2,047,555
MANUFACTURE OF HOLLOW TURBINE BLADES
Filed May 26, 1934  2 Sheets-Sheet 2

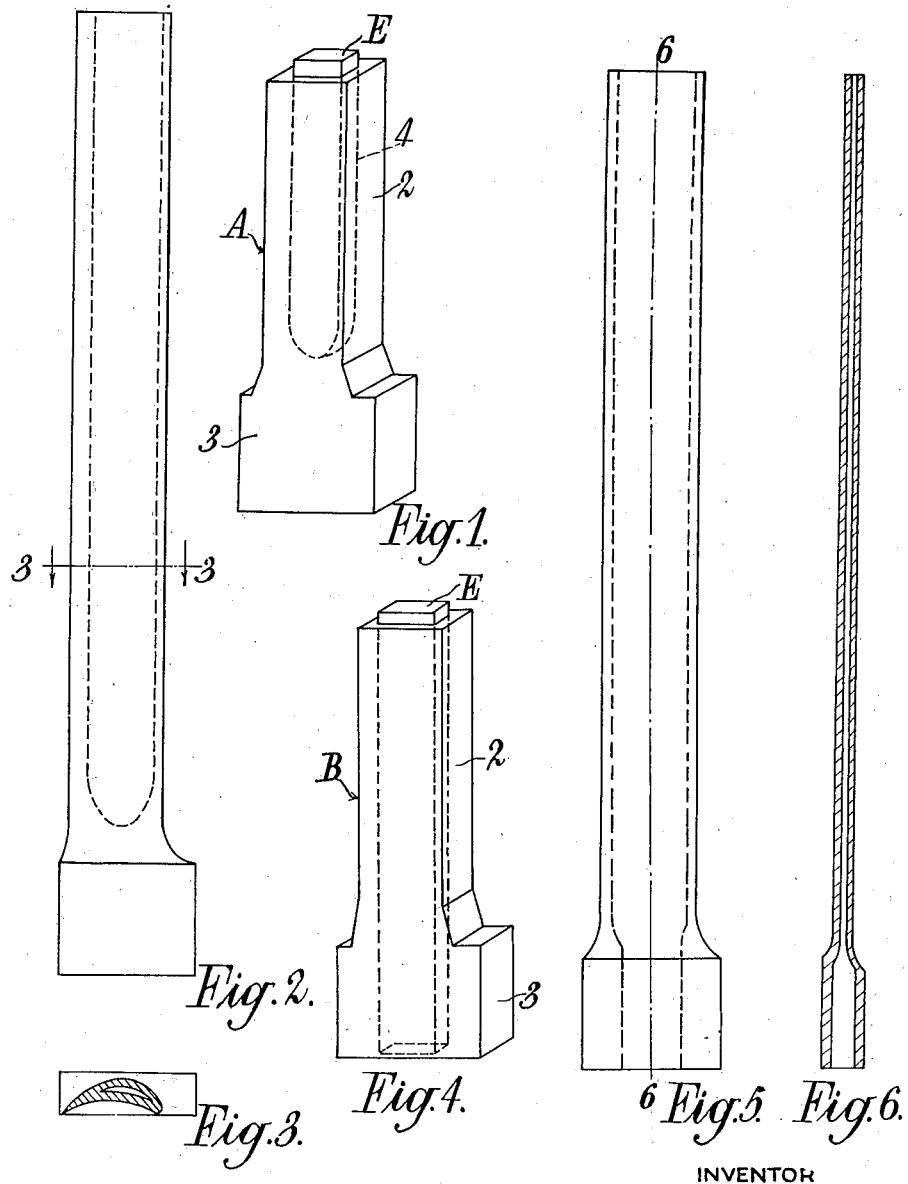

INVENTOR
Francis William Gardner
BY HIS ATTORNEYS

Patented July 14, 1936

2,047,555

UNITED STATES PATENT OFFICE 2,047,555

MANUFACTURE OF HOLLOW TURBINE BLADES

Francis William Gardner, Newcastle-on-Tyne, England, assignor to C. A. Parsons and Company, Limited, Newcastle-on-Tyne, England Application May 26, 1934, Serial No. 727,622
In Great Britain May 31, 1933

2 Claims. (Cl. 29—156.8)

The invention relates to processes of manufacturing hollow, turbo-blades that are hollow for a part or the whole of their length.

In British Patent No. 398,899, processes for manufacturing hollow seamless turbo-blades are described of which the following may be taken as a typical example.

A billet or blank of steel is first prepared having a blade-forming part and a root-forming part of greater lateral extent. A hole, parallel or tapered, is then formed lengthwise through the blade-forming part for any required distance, this hole extending in some cases into the root-forming part in addition. If the blade-forming part of the billet is of rectangular cross-section, the hole in cross-section may have semi-circular ends connected by parallel sides, the metal of the hole being readily removed by a combination of drilling and milling operations.

The hole is then filled with some resistant material, e. g., a metal of comparatively low melting point, such as copper, which is melted out after the blade-forming part of the compound billet has been rolled out to elongate it and define its cross-section.

Different mixtures of sand have also been used as the filling agent.

Difficulties have arisen in practice, however, during the rolling or other elongating process, due to the great difference in the physical properties of the blade and filling materials as heretofore proposed, and a main object of the present invention is to overcome such difficulties.

With such an object:—

The present invention consists in a method of manufacturing hollow turbine blading comprising the series of steps hereinafter described and particularly pointed out in the claims.

The invention also consists in a filled metal billet on blank in which the characteristics of the body and core are similar as regards ductility but differ as regards corrodibility.

Referring to the accompanying diagrammatic drawings, which show by way of example the application to turbine blades of one form of process according to the present invention:—

Figure 1 shows a perspective view of a blank in which the hollow extends through only the blade-forming parts thereof, Figure 2 being an elevation of the hollow blade produced by the application of an elongating process to the blade-forming part of the blank shown in Figure 1, and Figure 3 a cross-section on the line 3—3 of Figure 2;

Figure 4 shows a perspective view of a blank similar in general to that shown in Figure 1, but with the hollow extending through both the blade-forming and root-forming parts thereof, Figure 5 being an elevation of the blade produced from the blank of Figure 4, and Figure 6 a longitudinal section on the line 6—6 of Figure 5;

Figure 7:
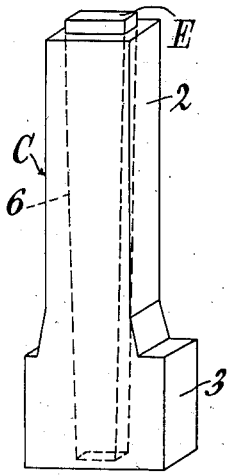
Figure 8:
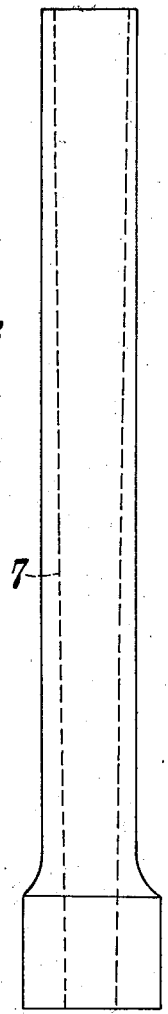
Figure 9:
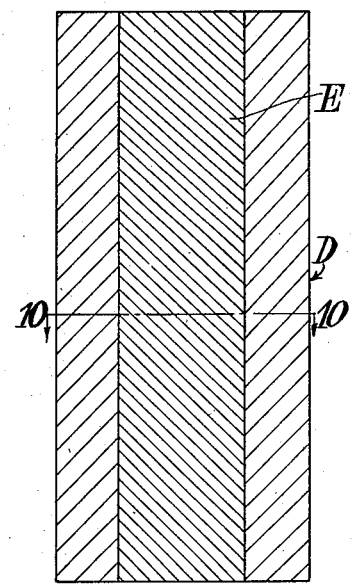
Figure 10:
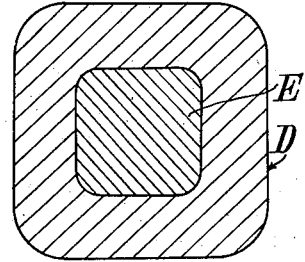
Figure 11:
Figure 12:

In all the above figures, the hollows in the blanks and blades are of parallel formation and by contrast Figure 7 shows a perspective view of a blank in which the hollow extending through both the blade-forming and root-forming parts thereof is of tapered form, Figure 8 showing an elevation of the corresponding blade;

Figure 9 shows a sectional elevation of a filled blank suitable for the production of strip-blading without integral roots, Figure 10 being a corresponding section on the line 10—10 of Figure 9; and finally Figure 11 shows an elevation to a smaller scale of a length of rootless blading produced from the blank shown in Figure 9, Figure 12 being a cross-section on the line 12—12 of Figure 11.

The same reference symbols are used in the different figures to denote corresponding parts.

In carrying the invention into effect according to the form shown in Figures 1 to 3, applied to the manufacture of turbo-blading of the Parsons reaction type, the billet, A, having a blade-forming part, 2, and a root-forming part, 3, is made of stainless steel and at a suitable stage of the process is provided with a parallel hole, 4, which extends through only the blade-forming part of the billet; in some cases, however, as shown in Figures 4 to 6, the hole, 5, in the billet, B, extends also through the integral root-forming part, 3, in addition.

In other cases, (see Figure 7) the hole, 6, in the billet, C, tapers towards the root so that the resulting blade (see Figure 8) has walls, 7, decreasing in thickness from the root towards the tip.

Or again, (see Figures 9 and 10) a plain hollow billet, D, is first produced of uniform cross-section from end to end for cases in which it is desired to manufacture strip blading as shown in Figures 11 and 12 without a root.

The hollow, whatever its particular form, is then plugged with a well-fitting plug, E, of mild steel, of similar ductile properties to the stainless steel of the billet, forced into and entirely filling it, and after submitting only the blade-forming part of the billet so prepared to an elongating process, e. g., rolling, as described in the above-identified specification, the blade is treated with a solvent, e. g., nitric acid, which in due course eats away the mild steel core of the blade but leaves the stainless steel unaffected.

It will be seen that by forming the compound billet of two metals having about the same qualities as regards ductility, the rolling operations are effected with substantially the same accuracy as in rolling a billet of the same material throughout, and irregularities and abnormalities are wholly or largely eliminated.

In addition, the temperature of the blade is not substantially raised when removing the core, as in the case of melting out a copper filling, and there is consequently no tendency to produce distortion of the finished blade.

Instead of plugging the hollow billet, i. e., inserting a solid plug of metal, the filling may be effected in some cases by pouring in metal in a molten state that has the characteristics pointed out above.

In suitable cases a brass or copper core may be used in a stainless steel blank.

Processes for manufacturing hollow billets other than those described and other materials and corrosive agents may be used without exceeding the scope of the present invention.

I claim:

1. A process of manufacturing hollow seamless turbine blading which consists in providing a seamless metal blade blank having a longitudinally-disposed hollow, the metal of said blank having a certain degree of ductility but substantially no corrodibility, filling said hollow metal blank with a metal core, the metal of which is similar to the metal of said blank as regards its degree of ductility but differs therefrom in possessing the quality of corrodibility, rolling and elongating said filled blank to an asymmetrical cross section and removing the core by submitting said elongated product to the action of a corrosive agent.

2. A process of manufacturing hollow seamless turbine blades as claimed in claim 1, in which the metal blank is of stainless steel and the core of mild steel.

FRANCIS WILLIAM GARDNER.